(12) United States Patent
Hashimoto

(10) Patent No.: US 7,671,916 B2
(45) Date of Patent: Mar. 2, 2010

(54) MOTION SENSOR USING DUAL CAMERA INPUTS

(75) Inventor: Kazuyuki Hashimoto, Mountain View, CA (US)

(73) Assignee: Electronic Arts Inc., Redwood City, CA (US)

( * ) Notice: Subject to any disclaimer, the term of this patent is extended or adjusted under 35 U.S.C. 154(b) by 1278 days.

(21) Appl. No.: 10/861,582

(22) Filed: Jun. 4, 2004

(65) Prior Publication Data

US 2005/0270368 A1  Dec. 8, 2005

(51) Int. Cl.
*H04N 5/222* (2006.01)
*H04N 7/18* (2006.01)
*A63F 9/24* (2006.01)
*A63F 13/00* (2006.01)
*G06F 17/00* (2006.01)
*G06F 19/00* (2006.01)

(52) U.S. Cl. .............. 348/333.01; 348/61; 348/135; 348/142; 463/1; 463/36; 250/206.1

(58) Field of Classification Search ............ 348/61, 348/135, 333.01, 139, 140; 463/1, 34, 36, 463/47; 250/206.1
See application file for complete search history.

(56) References Cited

U.S. PATENT DOCUMENTS

| | | | |
|---|---|---|---|
| 4,969,036 A | 11/1990 | Bhanu et al. | |
| 5,473,364 A | 12/1995 | Burt | |
| 6,233,003 B1 | 5/2001 | Ono | |
| 6,249,285 B1 | 6/2001 | Madden et al. | |
| 6,317,151 B1 | 11/2001 | Ohsuga et al. | |
| 6,430,304 B2 | 8/2002 | Hanna et al. | |
| 6,487,421 B2 | 11/2002 | Hess et al. | |
| 6,522,787 B1 | 2/2003 | Kumar et al. | |
| 6,665,003 B1 | 12/2003 | Peleg et al. | |
| 2001/0017651 A1 | 8/2001 | Baker et al. | |
| 2001/0039212 A1* | 11/2001 | Sawano et al. | 463/43 |
| 2002/0024635 A1 | 2/2002 | Oshima | |
| 2002/0167537 A1 | 11/2002 | Trajkovic | |
| 2003/0048947 A1 | 3/2003 | Grindstaff et al. | |
| 2003/0118217 A1* | 6/2003 | Kondo et al. | 382/117 |

(Continued)

OTHER PUBLICATIONS

Wagner, Daniel. Augmented Reality Kanji Learning. 2003. IEEE Computer Society. Proceedings of the 2nd IEEE/ACM International Symposium on Mixed and Augmented Reality, pp. 335-336.*

(Continued)

*Primary Examiner*—Lin Ye
*Assistant Examiner*—Chia-Wei A Chen
(74) *Attorney, Agent, or Firm*—Townsend and Townsend and Crew LLP

(57) ABSTRACT

Motion sensing of a portable device using two cameras. A first camera is directed along a first viewing axis and a second camera is directed along a second viewing axis, different from the first viewing axis. The second viewing axis can be substantially opposite the first viewing axis. A motion processing module determines changes in images from the first camera and changes in images from the second camera. The motion processing module compares the direction of change determined from the first camera images relative to the direction of change determined from the second camera images. The motion processing module determines the motion of the portable device based in part on the comparison.

32 Claims, 6 Drawing Sheets

U.S. PATENT DOCUMENTS

| | | |
|---|---|---|
| 2003/0156304 A1* | 8/2003 | Fedorovskaya et al. ..... 358/527 |
| 2003/0210461 A1 | 11/2003 | Ashizaki et al. |
| 2003/0215010 A1* | 11/2003 | Kashiwa ................ 375/240.02 |
| 2004/0212586 A1 | 10/2004 | Denny, III |
| 2005/0140565 A1 | 6/2005 | Krombach |
| 2005/0212757 A1* | 9/2005 | Marvit et al. ................ 345/156 |
| 2005/0212766 A1 | 9/2005 | Reinhardt et al. |
| 2006/0146009 A1* | 7/2006 | Syrbe et al. ................. 345/156 |

OTHER PUBLICATIONS

Wagner, Daniel. First Steps Towards Handheld Augmented Reality. 2003. IEEE Computer Society. Proceedings of the 7th IEEE International Symposium on Wearable Computers, pp. 127-135.*

* cited by examiner

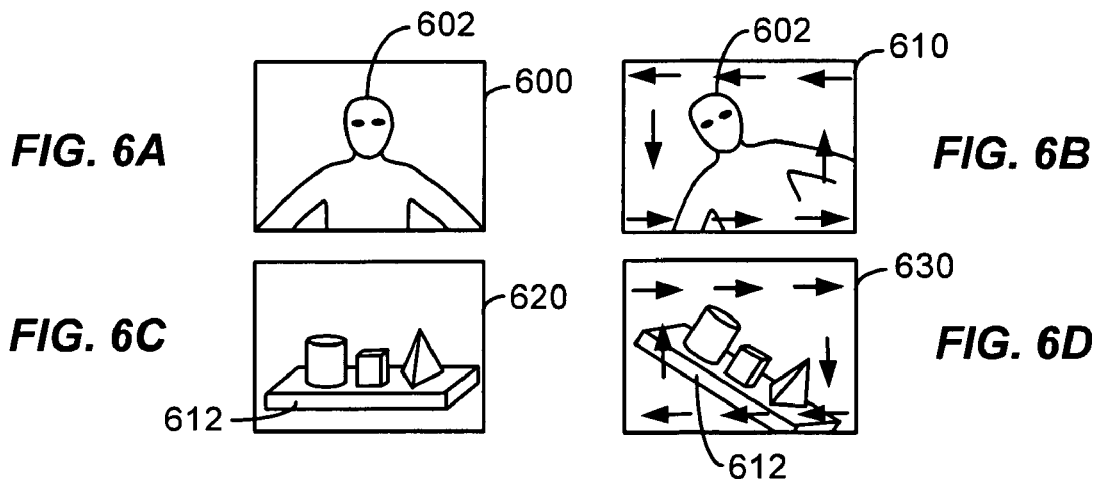
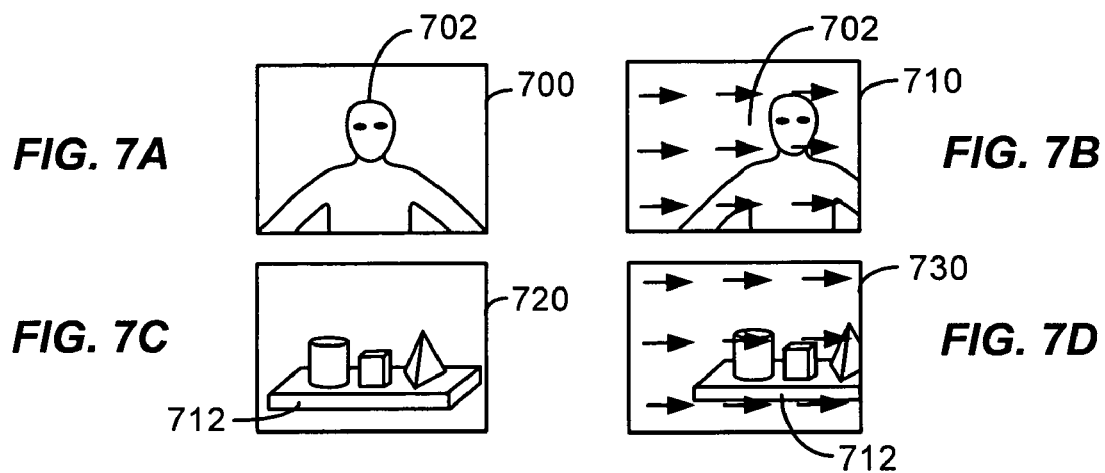
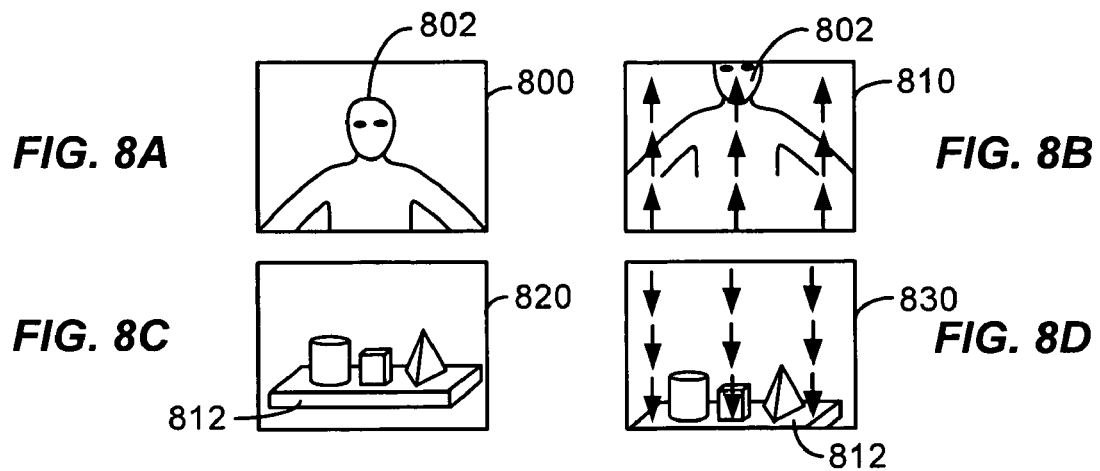

MOTION SENSOR USING DUAL CAMERA INPUTS

BACKGROUND OF THE INVENTION

Sensing the motion of a device can be a time consuming task that requires intensive numerical processing. Additionally, motion sensing may only provide a gross measure of the motion of a device. Sensing motion of a portable object may require costly hardware and complicated numerical processing techniques.

Motion sensing using trilateration of positions, as performed by a Global Positioning System (GPS) or a hybrid position determination system, may be inadequate for sensing motion of a portable device. A GPS system or hybrid position determination system typically provides inadequate precision to sense motion of a portable device. GPS can require a great deal of time to acquire an initial position fix. Additionally, a GPS system or hybrid position determination system typically cannot determine rotational motion of a portable device.

Motion sensing systems incorporating gyroscopes can be used to sense the motion of a portable device. However, such systems are typically costly and not suitable for low cost designs. The costs associated with gyroscopes used in motion sensing may exceed a perceived value of the entire portable device.

BRIEF SUMMARY OF THE INVENTION

Motion sensing of a device using a plurality of cameras is disclosed. A first camera can be directed along a first viewing axis and a second camera can be directed along a second viewing axis, different from the first viewing axis. The second viewing axis can be substantially opposite the first viewing axis. A processor can determine changes in images from the first camera and changes in images from the second camera the determine respective directions of change. The processor can compare the direction of change determined from the first camera images relative to the direction of change determined from the second camera images. The processor can then determine the motion of the device based in part on the comparison.

One aspect of the invention includes a motion sensing device. The motion sensing device can include a first camera configured to capture images along a first viewing axis, a second camera configured to capture images along a second viewing axis different from the first viewing axis, and a motion processing module configured to determine motion of the device based in part on the images from the first camera and the second camera.

In another aspect, the invention includes a motion sensing device. The motion sensing device can include a first camera having a viewing axis directed away from a front of the device, and configured to capture images, a second camera having a viewing axis directed away from a rear of the device, and configured to capture images, a motion processing module configured to determine a motion of the device based in part on the images from the first camera and the second camera, and further configured to generate a display image based in part on the motion of the device, and a display coupled to the motion processing module and configured to display the display image.

In still another aspect, the invention includes a motion sensing system. The system can include a first camera positioned along a first viewing axis, and configured to capture first camera images, a second camera positioned along a second viewing axis different from the first viewing axis, and configured to capture second camera images, a motion processing module configured to determine a motion parameter based in part on at least two first camera images and at least two second camera images, a base device configured to process the motion parameter and generate a display signal based in part on the motion parameter, and a display configured to display the display signal generated by the base device.

In still another aspect, the invention can include a motion sensing method. The method can include receiving a plurality of images from a first camera, receiving a plurality of images from a second camera, determining a first image translation based in part on the first camera images, determining a second image translation based in part on the second camera images, comparing the first image translation to the second image translation, and determining the motion of the device based in part on the comparison.

In yet another aspect, the invention can include a motion sensing method. The method can include receiving a motion parameter determined from images captured along a first viewing axis and images captured along a second viewing axis substantially opposite the first viewing axis, retrieving a display image from a plurality of stored images, modifying the display image based at least in part on the motion parameter, and communicating the modified display image to a portable device.

In yet another aspect, the invention can include one or more processor readable storage devices configured to store one or more processor readable instructions to be executed by one or more processors, the instructions directing the processor to perform a method. The method can include receiving a plurality of images from a first camera, receiving a plurality of images from a second camera, determining a first image translation based in part on the first camera images, determining a second image translation based in part on the second camera images, comparing the first image translation to the second image translation, and determining the motion of the device based in part on the comparison.

In still another aspect, the invention can include one or more processor readable storage devices configured to store one or more processor readable instructions to be executed by one or more processors, the instructions directing the processor to perform a method. The method can include receiving a motion parameter determined from images captured along a first viewing axis and images captured along a second viewing axis substantially opposite the first viewing axis, retrieving a display image from a plurality of stored images, modifying the display image based at least in part on the motion parameter, and communicating the modified display image to a portable device.

BRIEF DESCRIPTION OF THE DRAWINGS

The features, objects, and advantages of embodiments of the disclosure will become more apparent from the detailed description set forth below when taken in conjunction with the drawings, in which like elements bear like reference numerals.

FIGS. 6A-6D are illustrative examples of images captured by cameras.

FIGS. 7A-7D are illustrative examples of images captured by cameras.

FIGS. 8A-8D are illustrative examples of images captured by cameras.

DETAILED DESCRIPTION OF THE INVENTION

A portable device having motion sensing capabilities, and a method of sensing motion in a portable device are disclosed. The device and method use images captured from multiple cameras positioned along different viewing axis. The images captured by the multiple cameras can be processed to determine a direction of change. The direction of change in images captured from a first camera relative to the direction of change in images captured from a second camera can be used to sense motion of the device.

Figure 1:
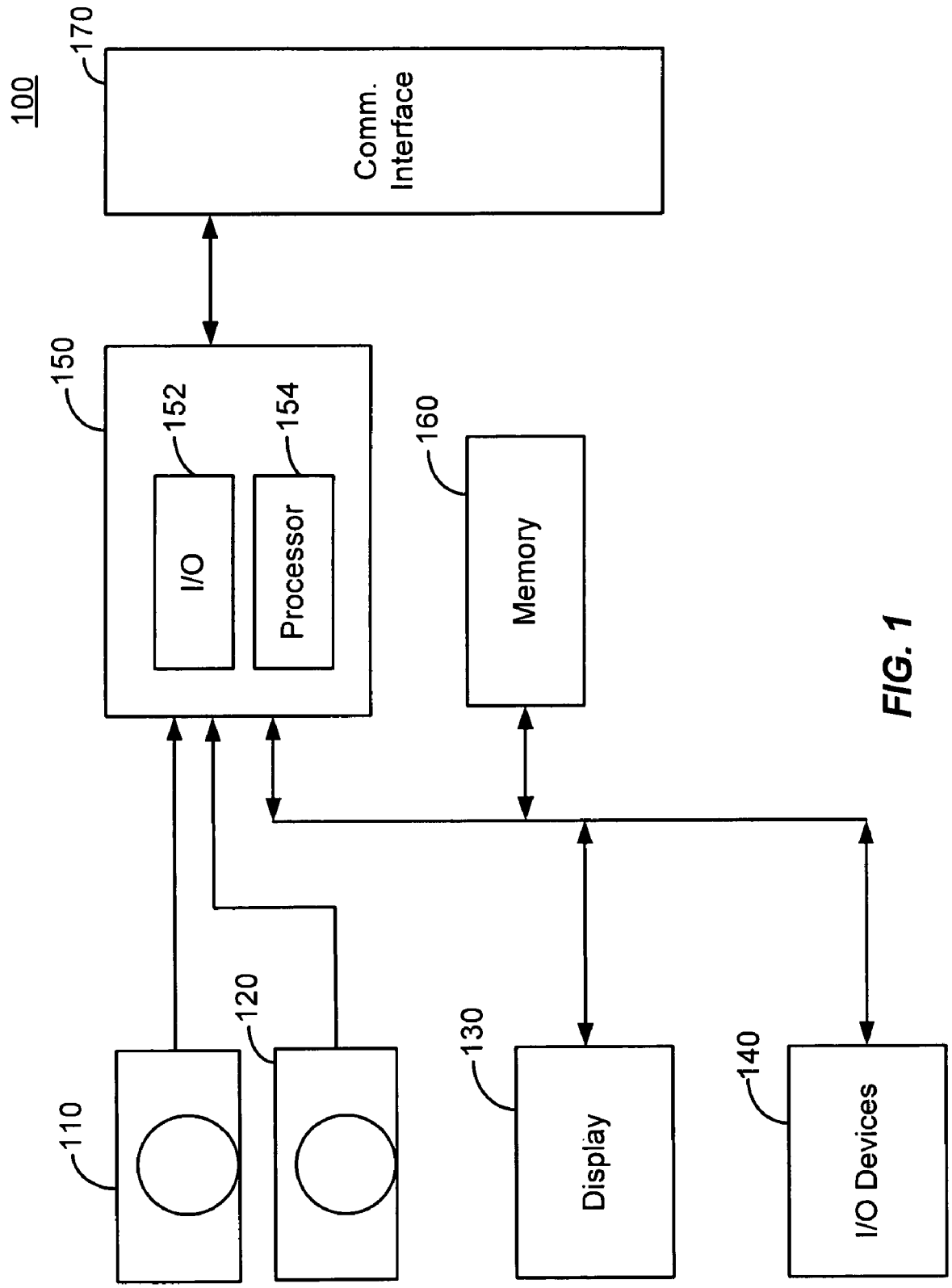
FIG. 1 is a functional block diagram of a motion sensing device.

FIG. 1 is a functional block diagram of a motion sensing device 100. The device 100 includes a first camera and a second camera 120 coupled to a motion processing module 150. The motion processing module 150 can include, for example, an Input/Output (I/O) controller 152 and a processor 154. The motion processing module 150 can be coupled to memory 160, and can be coupled to a communication interface 170. The motion processing module 150 can also be coupled to a display 130 and I/O devices 140.

The motion sensing device 100 can be configured to sense the motion of the device based in part on the images captured by the first camera 110 and the second camera 120. The first camera 110 can be positioned along a first viewing axis, where the viewing axis can include the line that extends from the imaging device in the camera to a center of the image captured by the camera. The second camera 120 can be positioned along a second viewing axis. Preferably, the first viewing axis is different from the second viewing axis. In one embodiment, the second camera 120 can be positioned along a second viewing axis that is substantially opposite the first viewing axis. That is, if the first camera 110 captures an image from a front of the device 100, the second camera 120 can be positioned to capture an image from a back of the device 100. It may be advantageous to position the cameras 110 and 120 with viewing axes in substantially orthogonal axes if the cameras 110 and 120 are not positioned substantially in opposite directions. However, any two viewing axes can be acceptable provided the images captured by the cameras 110 and 120 are not perfectly correlated.

The cameras 110 and 120 can be analog cameras or digital cameras, and each camera can be the same or different from other cameras. For example, a camera, for example 110, can be an analog camera, a Charge Coupled Device (CCD) camera, a CMOS camera, and the like, or some other device for capturing images. Additionally, the cameras 110 and 120 may capture visible images or may be configured to capture images outside the visible spectrum. For example, the camera, for example 110, can be a visible light camera, an infrared camera, and the like, or some other device for capturing images.

The first camera 110 can be configured to capture sequential images and the second camera 120 can also be configured to capture sequential images. Where a camera continually captures images, the images captured at two distinct times may be considered sequential images. It may be advantageous for a first image captured by the first camera 110 to be captured approximately at the same time as a first image captured by the second camera 120. Similarly, it may be advantageous for a second or subsequent image captured by the first camera 110 to be captured approximately at the same time as an image captured by the second camera 120. The time between an image from the first camera 110 to its counterpart image from the second camera 120 should be less than 1 second and preferably less than 500 mSec, 250 mSec, 200 mSec, 150 mSec, 100 mSec, 50 mSec, 25 mSec or 10 mSec. Thus, for example, the difference between the time a first image is captured by the first camera 110 and the time a first image is captured by the second camera 120 can be less than 250 mSec.

The images captured by the cameras 110 and 120 are communicated to the motion processing module 150. The motion processing module can determine, based on the captured images, a direction of relative motion of the originating camera. For example, a left translation of a second image relative to a first image can indicate that the camera has moved right relative to the image. Alternatively, a left translation can indicate movement of the objects in the images. The motion processing module 150 can process the images and determine a relative direction of motion of the first camera 110 based in part on sequential images captured by the first camera 110. Similarly, the motion processing module 150 can process the sequential images from the second camera 120 and determine, based in part on the images, a relative direction of motion of the second camera 120. The motion processing module 150 can then compare the direction of motion of the first camera 110 to the direction of motion of the second camera 120 and, based at least in part on the comparison, determine a motion of the device 100. Additional descriptions of motion sensing are provided below in conjunction with FIGS. 4-8.

The motion processing module 150 can also receive a signal from a base device (not shown) via the communication interface 170. The received signal can be all or a portion of a signal to output on the display 130. The motion processing module 150 can output the signal on the display 130. The display can be, for example, a video display, a CRT display, an LCD display, a plasma display, an array of lights, and the like, or some other device for providing a display.

The motion processing module 150 can also output signals to another device (not shown) via the communication interface 170. For example, the motion processing module 150 can provide signals to another device indicative of the sensed motion. Additionally, the motion processing module 150 can receive user input via one or more I/O devices 140 and can provide signals to the other device based in part on the user input signals. The I/O devices 140 can include keys, keypads, buttons, joy sticks, keyboards, switches, dials, knobs, microphones, touch screens, and the like, or some other device for receiving input.

The device 100 can receive, via the communication interface, signals that are produced, at least in part, based on the signals output from the device 100. In one embodiment, the device 100 outputs signals corresponding to the sensed motion and receives a display signal that is modified based on the sensed motion signals.

In another embodiment, the device 100 outputs the captured images from one or more cameras 110 and 120 and also outputs the sensed device motion. The device 100 can then receive signals that are modified at least in part on the output signals. The received signals can include display signals to be output to the display 130 as well as other output signals.

In still another embodiment, the device 100 outputs the captured images from one or more cameras 110 and 120 and also outputs the sensed device motion. The device 100 can then receive an augmented reality image signal based on the signals output from the device 100. Alternatively, the device 100 can itself generate the augmented reality image.

The motion processing module 150 can then output the augmented reality image on the display 130. An augmented reality image can be a captured image that is modified to include synthetic or virtual images. The augmented image can include synthetic images superimposed on the captured image. Thus, an image captured by a camera, for example 120, can be modified to include virtual images not present in the captured image. The modified image can be displayed to a user via the display 130.

In another embodiment, the device 100 can be a handheld device and the first camera 110 can be configured to capture an image of a user's face when held by a user in a typical orientation. The motion processing module 150 can then determine a distance to the user's face based at least in part on the captured image. For example, the first camera 110 can capture an image that includes an image of a user's face. The motion processing module 150 can process the image to locate points in the image corresponding to the user's eyes. The motion processing module 150 can, for example, determine a distance between the eyes and estimate a distance from the user to the device 100.

In still another embodiment, the first camera 110 can be configured to capture at least two images of a user's face. The motion processing module 150 can then determine a change in distance to the user's face based at least in part on differences in the two captured image. For example, the first camera 110 can capture an image that includes an image of a user's face. The motion processing module 150 can process the image to locate points in the image corresponding to the user's eyes. The motion processing module 150 determines a relative distance between the eyes. For example, the relative distance may be a number of pixels or a percentage of full image width. The motion processing module 150 can repeat the relative eye distance measurement for the second captured image. The motion processing module 150 can then compare the two relative distances to estimate a change in the user's distance to the device 100.

The various modules shown in FIG. 1 and in the subsequent figures can be implemented as hardware, software executed by one or more processors, or a combination of hardware and software executed by processors. Software can include one or more processor readable instructions stored within a processor readable storage device. The one or more instructions can be executed by a processor or a plurality of processors to perform some or all of the functionality related a module.

The processor readable storage device can include the memory 160. The memory 160 can include ROM, RAM, non-volatile RAM, flash, magnetic memory, optical memory, floppy disks, storage tapes, CDROM, DVD, and the like, or some other device for storing instructions, data, or instructions and data.

Figure 2:
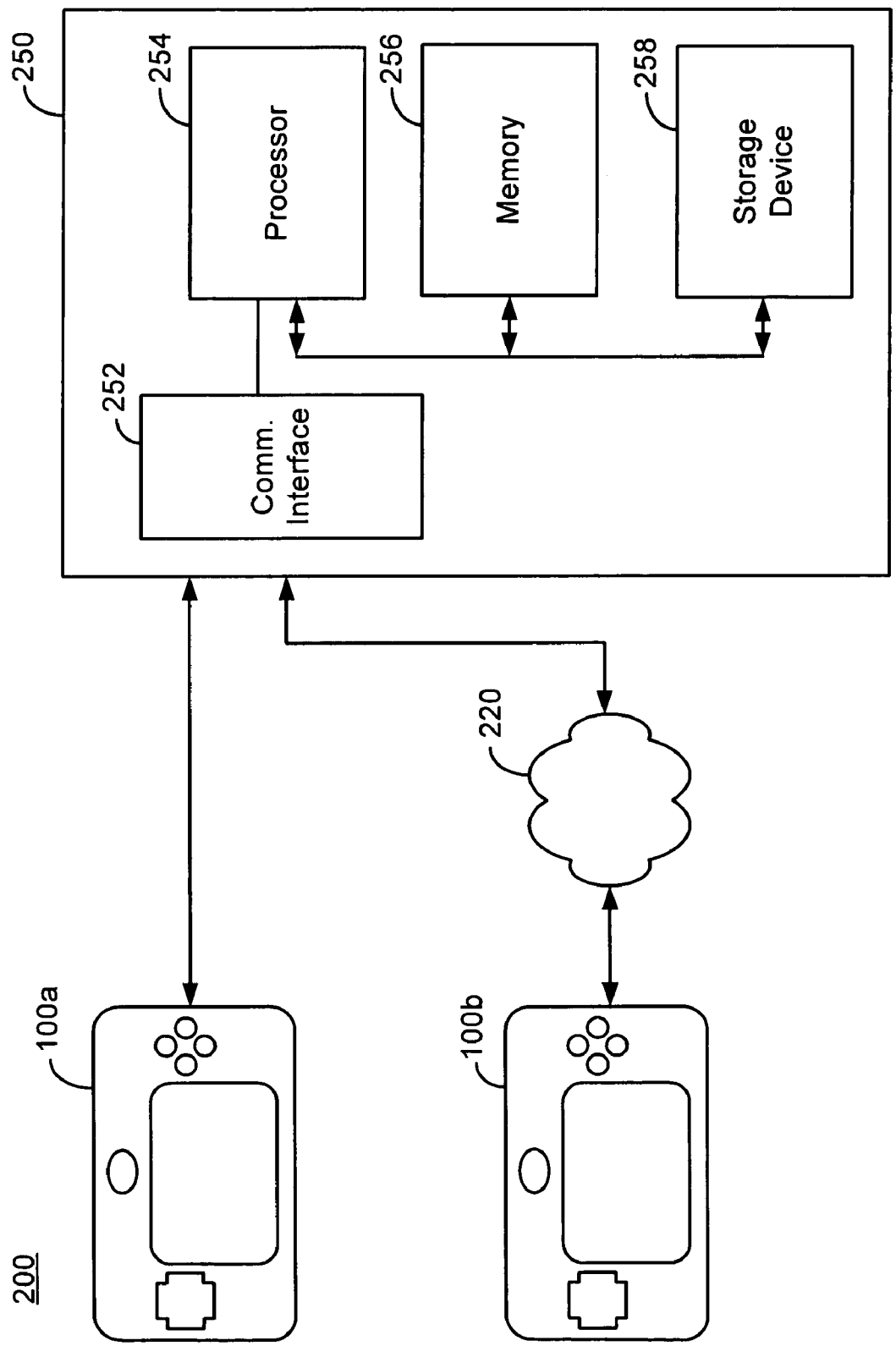
FIG. 2 is a functional block diagram of a motion sensing system.

FIG. 2 is a functional block diagram of a motion sensing system 200 having a plurality of remote devices 100*a* and 100*b* in communication with a base device 250. In the embodiment shown in FIG. 2, a first remote device 100*a* is directly coupled and in direct communication with the base device 250. The second remote device 100*b* couples and is in communication with the base device using a network 220. Each of the remote devices 100*a* and 100*b* can be, for example, the motion sensing device of FIG. 1.

The base device 250 can include a communication interface 252 configured to provide one or more interfaces to one or more remote devices 100*a*-100*b*. The communication interface 252 can be coupled to a processor 254. The processor 254 can also be coupled to memory 256 and a storage device 256. The storage device 258 can include any type of processor readable memory as previously described.

The remote devices 100*a* and 100*b* can be the same type of device or may be different devices. It may be advantageous for the remote device, for example 100*a*, to be a portable device. In one embodiment, the remote device 100*a* can be a portable gaming device, such as a game controller. In another embodiment, the remote device 100*a* can be a portable computer. In still another embodiment, the remote device 100*a* can be a personal digital assistant, calculator, phone, or some other type of portable device.

Similarly, the base device 250 can be a game console, a computer, a server, a base station, a host, a plurality of computers, and the like, or some other device. In some embodiments, the base device 250 can be another remote device.

The connection between the first remote device 100*a* and the base device 250 can be a wired connection, a wireless connection, or some combination of wired and wireless connection. A wired connection can include, but is not limited to, an electrical connection, a mechanical connection, an optical connection, and the like, or some other manner of communicatively coupling the first remote device 100*a* to the base device 250. A wireless connection can include, but is not limited to, an RF connection, a microwave connection, an optical link, an infrared link, an audio link, and the like, or some other manner of communicatively coupling the first remote device 100*a* to the base device 250.

The network 220 connecting the second remote device 100*b* to the base device 250 can be a private network or may be a public network. Additionally, the network may be a wired network, a wireless network, or some combination of wired and wireless network. The network may also be a Local Area Network (LAN), Metropolitan Area Network (MAN) or a Wide Area Network (WAN). In one embodiment, the network 220 can be a wireless LAN within a residence. In another embodiment, the network 220 can be the Internet.

Although the communication interface 252 is shown connected to only two remote devices 100*a* and 100*b*, the communication interface 252 may have only a single port or may have multiple ports, each capable of connecting to one or more remote devices.

In the motion sensing system of FIG. 2, the motion of a remote device, for example 100*a*, can be sensed completely within the remote device 100*a*, completely within the base device 250, or distributed across the remote device 100*a* and the base device 250.

For example, in an embodiment the base device 250 can receive images captured by the cameras in the first remote device 100*a*. The base device 250 can then determine the motion of the first remote device 100*a* based in part on the captured images. The base device 250 can then provide display images to the first remote device 100*a* based on the captured images and the sensed motion. The base device 250 can provide, for example, an augmented reality image to be displayed on the first remote device 100*a*.

In another embodiment, the first remote device 100*a* can capture images and sense its motion based in part on the captured images. The first remote device 100*a* can communicate the sensed motion and a subset of captured images to the base device 250. For example, the first remote device 100*a* may only communicate a subset of captured images from one of the plurality of cameras. The base device 250 can then receive the sensed motion, receive the subset of captured images, and provide a signal to the remote device 100a based in part on the received motion and images. For example, the base device 250 may provide an augmented reality display image to the remote device 100a based in part on the received sensed motion signal and the received subset of images.

Additionally, the base device 250 can estimate the distance of the first remote device 100a from its user, based in part on the received captured images, and provide a display image that is modified based in part on the estimated distance. Alternatively, the remote device 100a can estimate its distance from the user and communicate the estimate to the base device 250. The base device 250 can receive the distance estimate, generate the display image based in part on the distance estimate, and provide the display image to the remote device 100a.

In still another embodiment, the base device 250 may receive a combination of captured images, sensed motion, and user distance estimate from a first remote device 100a and generate a display image based in part on the received signals. The base device 250 can communicate the display image to one or more remote devices, for example 100b, that may or may not include the first remote device 100a.

In an embodiment, the motion sensing system of FIG. 2 can be a video gaming system. The remote devices 100a and 100b can be handheld controllers for the video gaming system and the base device 250 can be a video game console or game processor. The storage device 258 within the base device 250 can be, for example, an optical disk reader configured to interface with one or more optical disks, such as Compact Discs (CD) or Digital Versatile Discs (DVD) having stored thereon a video game or an interactive player game.

Each of the remote devices 100a and 100b can be a handheld controller having a video display 130 positioned on a surface directed towards the user. The I/O devices 140 for a remote device 100 can be buttons, switches, or devices that are positioned and configured to accept user input, for example, from a user's thumbs or fingers. The first camera 110 can be positioned at the top center of the of the handheld controller and can have a viewing axis that is aligned with the direction of the display 130. The second camera 120 can be positioned opposite the first camera 110 and can have a viewing axis that is substantially opposite the viewing axis of the first camera 110.

A game that is played from a storage device 258 can be, for example a driving game such as an interactive racing game or an interactive street driving game. The base device 250 or game console can send information such as video display information and audio information to the handheld controller. The system can use the multiple cameras to detect the motion of the handheld controller. For example, the handheld controller can operate as a steering wheel and the system can determine when the handheld controller is rotated. The rotation can be interpreted by the game system to be a rotation of a steering wheel. The game console may then modify the video and audio information based on the detected motion. For example, the system may detect motion of the handheld controller and allow the user to drive a course by selectively rotating the handheld controller.

Another game that may be displayed from the storage device 258 can be, for example, an augmented reality game. The user can point the second camera 120 of the handheld controller towards a scene, such as a map, image, or a live view. The display 130 on the handheld controller can display an image captured by the second camera 120 that is augmented by one or more images from the base device 250 game console.

The system may monitor the motion of the handheld controller as well as the image captured by the second camera 120 and provide an augmented reality signal to the handheld controller in response to the captured image and detected motion. Thus, for example, the display 130 can show the image captured by the second camera 120 having augmented reality images inserted based on information provided by the game console. In an outdoor game setting, such a game may allow a user to roam through a real environment, such as a home or outdoor setting, and have an interactive gaming experience using augmented reality. Such games may include, for example, hunting games or combat games. Augmented reality animals or combatants, for example, may be added to images captured by the second camera 120.

Figure 3A:
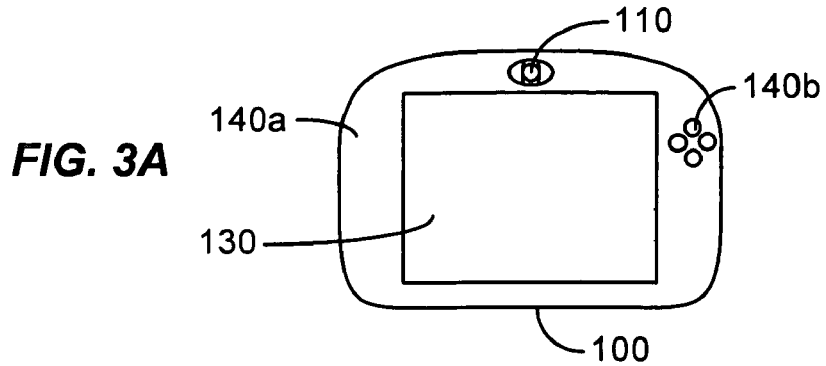
FIGS. 3A-3D are views of an embodiment of a motion sensing device.

FIGS. 3A-3D are views of an embodiment of a motion sensing device 100, which can be the motion sensing device of FIG. 1. FIG. 3A is a front view of the motion sensing device 100 and shows the position of the first camera 110 in the center top of the device 100, and a display 130 positioned on the front of the device 100. The front of the device 100 can also include a first user input device 140a positioned on the left hand side of the front panel and a second user input device 140b positioned on a right hand side of the front panel. The first user input device 140a is shown as a navigation pad, while the second user input device 140b is shown as a collection of buttons.

Figure 3B:
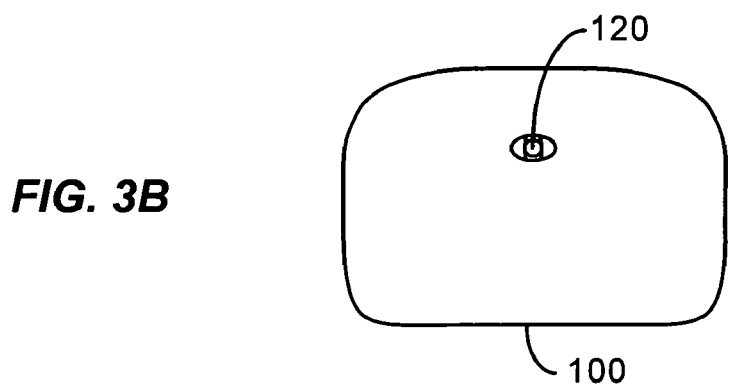

FIG. 3B is a rear view of the motion sensing device 100 and shows the position of the second camera 120 positioned approximately on a centerline of the back panel. The viewing axis of the first camera 110 is substantially opposite the viewing angle of the second camera 120. The two viewing axes are not along the same line, although the two axes are substantially parallel.

Figure 3C:
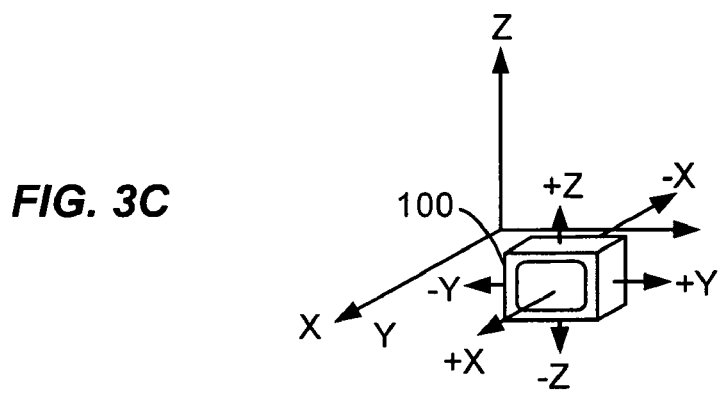

FIG. 3C shows an orientation of the motion sensing device 100 in a rectangular coordinate system for purposes of explanation. The directions referred to in the subsequent figures refer to the directions shown in FIG. 3C. As shown in FIG. 3C, the front of the motion sensing device 100 faces the positive x direction and the rear of the device 100 faces the negative x direction. Thus, the first viewing axis can be described as being in the +x direction and the second viewing axis can be described as being in the −x direction.

Figure 3D:
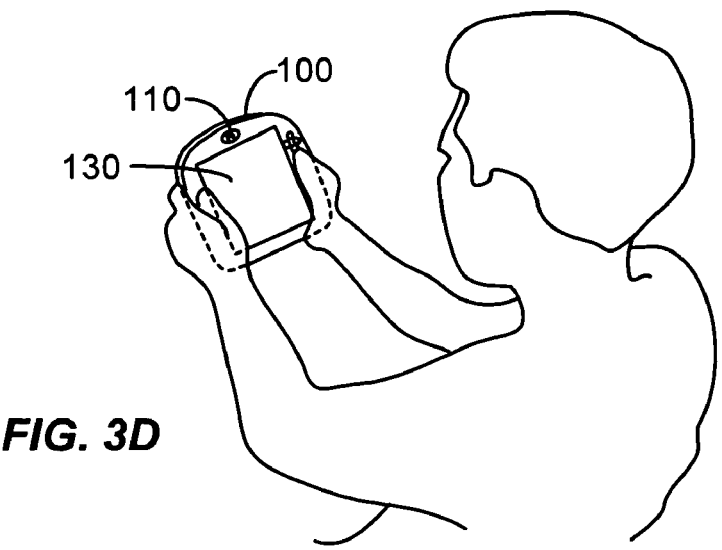

FIG. 3D shows an embodiment of the motion sensing device 100 in relation to a user. In a typical configuration, the front panel of the device 100 faces the front of the user. The user can see the display 130 and the camera 110 on the front panel of the device 100 can typically capture an image of the user's face.

In an augmented reality embodiment, the camera 120 on the back panel of the device 100, which is not shown in FIG. 3D, can capture an image that is within the user's field of view. The system, using the device, base device, or combination of devices, can then display augmented reality images on the display 130. By estimating the distance from the device 100 to the user, the image presented on the display 130 can be sized. The system can adjust the image size to make it appear as if the user is looking through a transparent window when the user views the display. However, the system can add virtual or synthetic images to the displayed image to provide an augmented reality environment.

FIGS. 4-8 show examples of images that can be captured by a pair of cameras. The cameras are configured with a first camera on a front of the device and a second camera on a rear of the device. The images are used to help illustrate how the device can perform motion sensing. The figures refer to first and second images captured by two separate cameras. As discussed previously, it may be advantageous for the first and second images captured by the rear facing camera to be captured substantially at the same time, respectively, that the front facing camera captures its first and second images. Additionally, the second image captured by a camera need not be the next image captured by the camera. Instead, the second image can refer to any subsequent image captured by the camera.

FIGS. 4A-4D show examples of images captured by a front facing camera and a rear facing camera. The images illustrate a horizontal translation of the device. Using the coordinate system of FIG. 3C, the horizontal translation can refer to movement along the +y or −y direction.

Figure 4A:
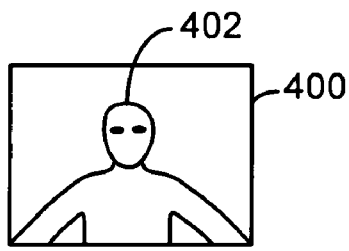
FIGS. 4A-4D are illustrative examples of images captured by cameras.
Figure 4B:
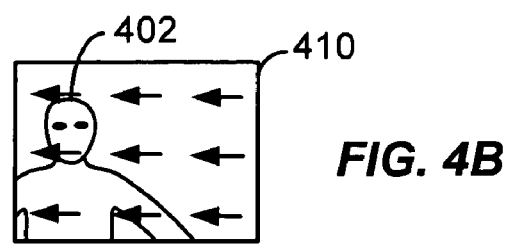

FIG. 4A shows a first image 400 that can be captured by a front facing camera. The term first is a relative term used to provide a reference relative to subsequent images. The first image 400 from the front facing camera shows an object 402 within the image. FIG. 4B shows a second image 410 captured by the front facing camera. The same object 402 can appear in the second image 410 and can be translated relative to the object 402 in the first image 400. The object 402 is illustrated as having moved to the left. The motion sensing device can determine a direction of motion by comparing the two images, 400 and 410. The motion sensing device need not make a detailed determination of the image. The motion sensing device may only determine that there was an image translation, and the direction of the image translation. Of course, the motion sensing device may perform additional image analysis and may determine an approximate magnitude of translation in addition to a direction of translation. Because the object 402 in the captured images of the front facing camera is translated to the left, the motion sensing device may determine the direction of motion of the device is to the left. However, the motion sensing device may not be able to make a motion determination without analyzing the images captured by the rear facing camera.

Figure 4C:
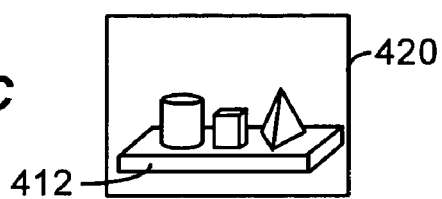
Figure 4D:
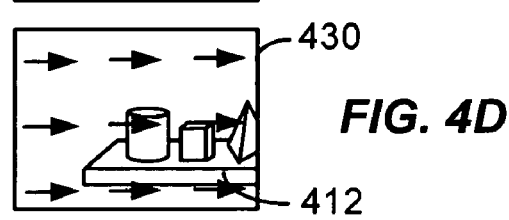

FIG. 4C shows a first image 420 captured by a rear facing camera. The first image 420 also shows an object 412 within the image 420. FIG. 4D shows a second image 430 captured by the rear facing camera. The second image 430 shows the same object 412 as in the first image 420, but translated to one side. The object 412 captured by the rear facing camera is shown as translated to the right. Thus, the motion sensing device may determine a direction of motion of the device is to the left.

The objects in the captured images appear to be translated in opposite directions, but because the two cameras face in opposite directions, the motion sensing device is able to determine that the direction of motion is the same. Because the motion sensing device determined that the direction of motion detected by the two cameras is the same, the motion sensing device is able to determine that the device translated to the left. Alternatively, the motion sensing device may determine a direction of image translation from images from a first camera. The motion sensing device can also determine a direction of image translation from images from a second camera. The motion sensing device can compare the two directions of image translation and determine a direction of device motion.

FIGS. 5A-5D show additional examples of images captured by a front facing camera and a rear facing camera. The images illustrate a vertical translation of the motion sensing device.

Figure 5A:
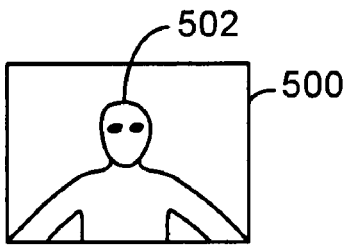
FIGS. 5A-5D are illustrative examples of images captured by cameras.
Figure 5B:
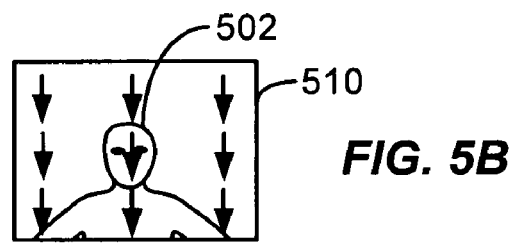

FIG. 5A shows a first image 500 captured by a front facing camera. The first image 500 shows an object 502 within the image 500. FIG. 5B shows a second image 510 captured by the front facing camera. The second image 510 shows the same object 502 shown in the first image 500, but translated downward. Thus, the motion sensing device can determine an upward direction of motion.

Figure 5C:
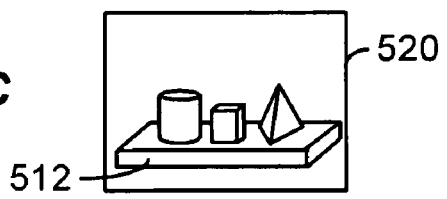
Figure 5D:
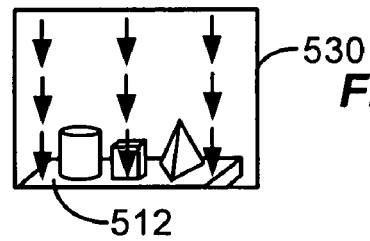

FIG. 5C shows a first image 520 captured by a rear facing camera. The first image 520 shows an object 512 within the image 520. FIG. 5D shows a second image 540 captured by the rear facing camera. The second image 540 shows the same object 512 shown in the first image 520 of the rear facing camera. However, the image is translated downward, indicating an upward direction of device motion.

The motion sensing device can compare the direction of image translation from the two sets of images to determine a device motion. Because the captured images showed a downward image translation for both of the cameras, the motion of the device can be determined to be an upward translation. Alternatively, the motion sensing device can compare the direction of motion and determine a device motion. Because the motion sensing device determined an upward direction of motion from both sets of images, the motion sensing device can determine that the motion was an upward translation.

FIGS. 6A-6D show additional examples of images captured by a front facing camera and a rear facing camera. The images illustrate a twisting translation of the motion sensing device. The twisting translation can also be referred to as a rotation of the motion sensing device. The rotation occurs along an axis of rotation extending in the x direction.

FIG. 6A shows a first image 600 captured by a front facing camera. The first image 600 shows an object 602 within the image 600. FIG. 6B shows a second image 610 captured by the front facing camera. The second image 610 shows the same object 602 shown in the first image 600, but rotated counterclockwise relative to a viewing axis of the camera. This corresponds to a counterclockwise rotation of the motion sensing device, where the direction refers to counterclockwise as viewed from the front of the device. Thus, the motion sensing device can determine a counterclockwise rotation as the direction of motion.

FIG. 6C shows a first image 620 captured by a rear facing camera. The first image 620 from the rear facing camera shows an object 612 within the image 620. FIG. 6D shows a second image 640 captured by the rear facing camera. The second image 640 shows the same object 612 shown in the first image 620 of the rear facing camera. However, the image is rotated clockwise relative to a viewing axis, indicating a counterclockwise rotation of the device as the direction of motion.

As discussed above, the motion sensing device can compare the direction of image translation from the two sets of images to determine a device motion. Because the captured images showed a opposite image rotations for the two cameras, the motion of the device can be determined to be rotation. The direction of rotation is the same as the direction of rotation shown by the front camera, which in this example is counterclockwise.

Alternatively, the motion sensing device can compare the direction of motion and determine a device motion. Because the motion sensing device determined a counterclockwise direction of motion from both sets of images, the motion sensing device can determine that the motion was a counterclockwise rotation along the camera viewing axis.

FIGS. 7A-7D show additional examples of images captured by a front facing camera and a rear facing camera. The images illustrate a rotation of the motion sensing device. The rotation occurs along an axis of rotation extending in the z direction.

FIG. 7A shows a first image 700 captured by a front facing camera. The first image 700 shows an object 702 within the image 700. FIG. 7B shows a second image 710 captured by the front facing camera. The second image 710 shows the same object 702 shown in the first image 700, but translated to the right of the image. The translation can correspond to a right side horizontal translation of the motion sensing device. Thus, the motion sensing device can determine that the direction of motion is to the right.

FIG. 7C shows a first image 720 captured by a rear facing camera. The first image 720 from the rear facing camera shows an object 712 within the image 720. FIG. 7D shows a second image 740 captured by the rear facing camera. The second image 740 shows the same object 712 shown in the first image 720 of the rear facing camera. However, the image is horizontally translated to the right. The horizontal translation can indicate the direction of motion is horizontally to the left.

Thus, the objects in the captured images appear to be translated in the same directions, but because the two cameras face in opposite directions, the motion sensing device determines opposite directions of motion. The motion sensing device determines the direction of motion of the front facing camera is right but the direction of motion of the rear facing camera is left. Because the motion sensing device determined that the direction of motion of the two cameras is the opposite, the motion sensing device is able to determine that the device rotated about the z axis. The motion sensing device can further determine from the directions of motion that the rotation is counterclockwise when the device is viewed from above.

Alternatively, the motion sensing device may determine the movement of the device based on the direction of image translation. The motion sensing device can compare the two directions of image translation and determine a direction of device motion. Thus, because the image translated right in both the front and rear camera images, the device can determine the movement corresponds to a counterclockwise rotation of the device when viewed from above.

FIGS. 8A-8D show additional examples of images captured by a front facing camera and a rear facing camera. The images illustrate a rotation of the motion sensing device about an axis of rotation along the y axis.

FIG. 8A shows a first image 800 captured by a front facing camera. The first image 800 shows an object 802 within the image 800. FIG. 8B shows a second image 810 captured by the front facing camera. The second image 810 shows the same object 802 shown in the first image 800, but translated upward. Thus, the motion sensing device can determine that a device direction of motion is downward.

FIG. 8C shows a first image 820 captured by a rear facing camera. The first image 820 shows an object 812 within the image 820. FIG. 8D shows a second image 840 captured by the rear facing camera. The second image 840 shows the same object 812 shown in the first image 820 of the rear facing camera. The image is translated downward, indicating an upward direction of device motion.

The opposite direction of image translation, and correspondingly, the opposite device direction of motion can indicate that the device has rotated about an axis of rotation that lies along the y direction. The motion sensing device can use the image translations or the directions of motion to determine that the direction of rotation is counterclockwise as viewed from the right of the device.

A motion sensing device can thus determine a direction of motion based on images captured by a plurality of cameras. Only two cameras are shown in the examples, but more than two cameras can be used in the device. Additionally, two cameras are shown having viewing axes that are in substantially opposite directions. However, the multiple cameras can be positioned along any viewing axes that are not identical or that do not result in completely correlated images.

By comparing the image translations or device direction of motion determined from the images, the motion sensing device can determine if the device has translated or rotated. The motion sensing device can determine horizontal translation along an axis parallel to a viewing axis by comparing, for example, the size of objects in two or more images. A summary of image translations and motion determination is provided in Table 1 for a two camera embodiment having a first camera facing forward and a second camera facing rearward.

TABLE 1

| Image Translation Front Camera | Image Translation Rear Camera | Device Motion |
|---|---|---|
| Larger | Smaller | +x Translation |
| Smaller | Larger | −x Translation |
| Left | Right | +y Translation |
| Right | Left | −y Translation |
| Down | Down | +z Translation |
| Up | Up | −z Translation |
| CCW Rotation | CW Rotation | CCW x-axis Rotation |
| CW Rotation | CCW Rotation | CW x-axis Rotation |
| Up | Down | CCW y-axis Rotation |
| Down | Up | CW y-axis Rotation |
| Right | Right | CCW z-axis Rotation |
| Left | Left | CW z-axis Rotation |

Although examples of device translations and rotations were provided for on-axis translations and rotations, any device translation or rotation can be determined based on a combination of on-axis translations and/or rotations. For example, an arbitrary device translation can be determined as a combination of device translations in each axis direction. The vector sum of each of the on-axis translations can equal a translation to any three dimensional location. Similarly, a rotation along any arbitrary axis can be determined as a combination of device rotations along each axis.

For example, a translation of the device along an arbitrary direction can be determined as a vector sum of motion along the x, y, and z axis. As can be seen from Table 1, translation along each of the three axis can be determined exclusive of translation along another axis. Thus, the motion sensing system may, for example, determine translation along the x-axis, followed by the y-axis and the z-axis. The total translation can be determined as the vector sum of each of the translations.

Additionally, rotation along an arbitrary axis can be determined as a sum of rotations along each of the axis. As can be seen from Table 1, the movements of the camera images used to determine axis of rotation are independent and thus, the individual axis rotations can be determined from an arbitrary rotation.

Although the some of the rotations and translations are determined from the same image translations, a rotation can be differentiated from a translation by comparing the magnitude of the different image translations. For example, a y-axis translation and a z-axis rotation both can be determined based on left or right image translations. However, when the cameras are positioned substantially opposite one another, the magnitude of image translation should be approximately the same for images from the two cameras. When the magnitude of image translation from the two cameras differs, the system can determine a composite translation and rotation. The difference in the magnitude of translations and the direction of the difference, can be used to determine the component of image translation attributable to either device translation or rotation.

Figure 9:
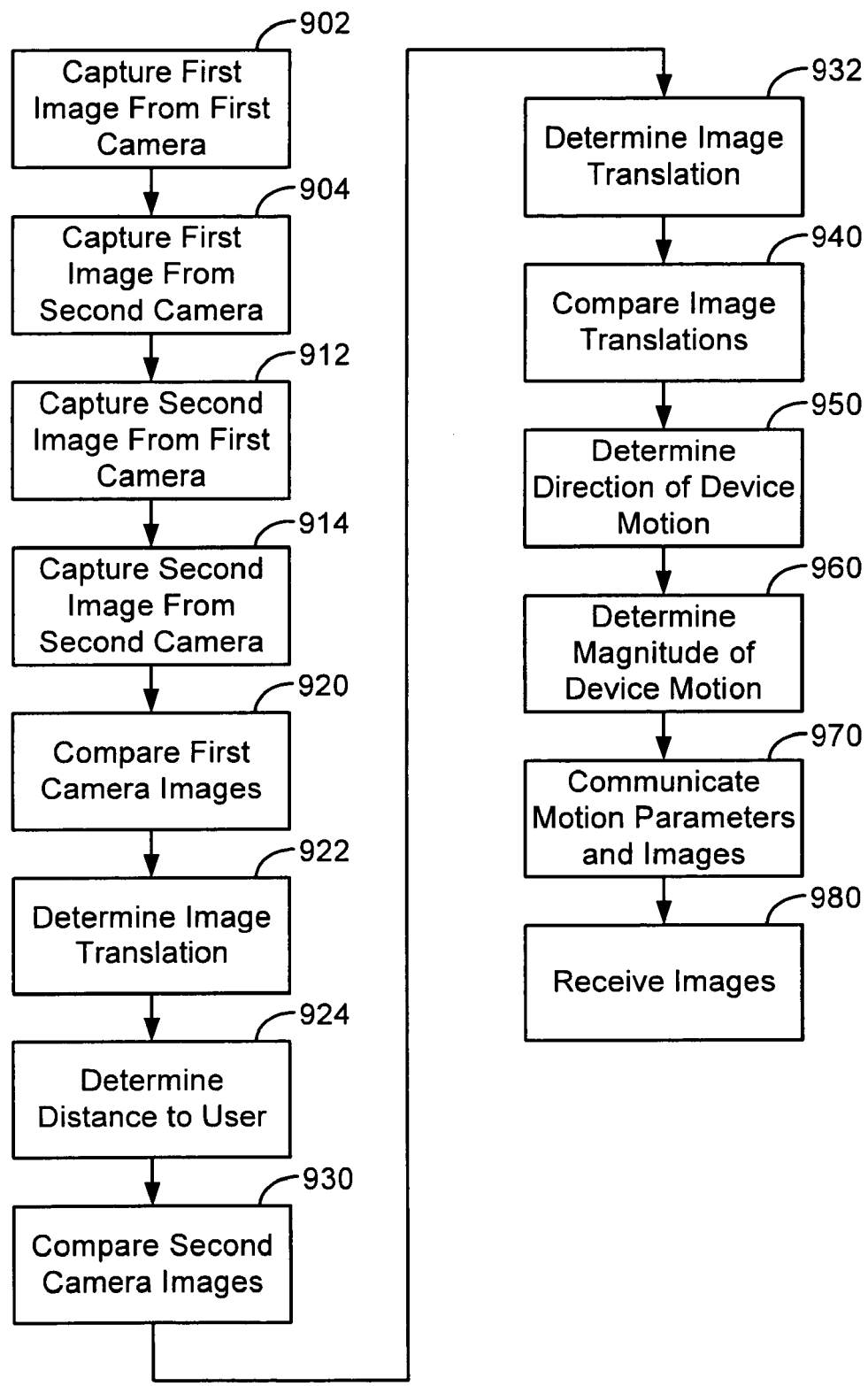
FIG. 9 is a flowchart of an embodiment of a motion sensing process.

FIG. 9 is a flowchart of an embodiment of a motion sensing process 900 that can be implemented, for example, in the motion sensing device of FIG. 1 or the motion sensing system of FIG. 2. The process 900 can begin at block 902 when the motion sensing device captures a first image from a first camera. As previously discussed, the first camera can be, for example, a forward facing camera.

The motion sensing device next proceeds to block 904 where the device captures a first image from a second camera. The second camera can be, for example, a rear facing camera. The motion sensing device next proceeds to block 912 and captures a second image from the first camera. At block 914, the motion sensing device captures the second image from the second camera. The first and second images from each of the first and second cameras can be, for example, stored in memory or some storage device.

The motion sensing device next proceeds to block 920 and compares the first and second images from the first camera. At block 922, the motion sensing device determines an image translation based on the comparison of the captured images. Alternatively, the motion sensing device can determine a device direction of motion from the first camera images.

The motion sensing device next proceeds to block 924 and determines a distance from the motion sensing device to a user. As discussed earlier, the motion sensing device can determine or estimate the distance to a user by measuring analyzing an image of the user's face to determine a distance between the eyes, and thus derive a distance to the device.

The motion sensing device then proceeds to block 930 and compares the images captured by the second camera. In block 932, the motion sensing device determines an image translation based on the comparison of the captured second camera images. Alternatively, the motion sensing device can determine a device direction of motion from the second camera images.

The motion sensing device next proceeds to block 940 where it compares the image translation determined from the first camera images to the image translation determined from the second camera images. The motion sensing device can compare, for example, the direction of horizontal or vertical translation and the direction of rotation. At block 950, the motion sensing device determines a direction of device motion based in part on the comparison of image translations.

Proceeding to block 950, the motion sensing device can also determine a magnitude of the device motion based in part on the magnitude of image translation or image rotation in each of the first and second camera image pairs. In block 960, motion sensing device can communicate the motion parameters and one or more images to another device, such as the base device or another motion sensing device as shown in FIG. 2. The motion parameters can include, for example, the direction of motion, including translation and rotation, the magnitude of the motion, and the distance from the user. The images can include some or all of the images captured by the cameras. In one embodiment, the motion sensing device communicates the images captured by the rear facing camera and does not communicate the images from the front facing camera.

The motion sensing device then proceeds to block 980 and can receive display signals from another device, such as the base device or another motion sensing device. The display signals can be signals that are generated based in part on the images and motion parameters communicated by the motion sensing device. In one embodiment, the motion sensing device receives augmented reality display signals from a base device and displays the augmented reality signals on a display.

The various steps or blocks of the process 900 can be performed in another order and do not need to be performed in the order shown in FIG. 9. Additionally, blocks, steps, or functions may be added to the process, 900 or deleted from the process 900. Additional blocks, steps, or functions can be added at the beginning of the process, at the end of the process, or in between one or more existing blocks of the process.

Thus a motion sensing device has been disclosed that can determine motion based in part on images captured from a plurality of cameras. The motion sensing device can compare a first set of images from a first camera and determine image translation within the first set of images. The motion sensing device can also compare a second set of images from a second camera and determine image translation within the second set of images. The motion sensing device can then compare the image translation determined from the first set of images to the image translation from the second set of images. The motion sensing device can then determine motion based in part on the comparison.

The various illustrative logical blocks, modules, and circuits described in connection with the embodiments disclosed herein may be implemented or performed with a general purpose processor, a digital signal processor (DSP), a Reduced Instruction Set Computer (RISC) processor, an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration.

The steps of a method, process, or algorithm described in connection with the embodiments disclosed herein may be embodied directly in hardware, in a software module executed by a processor, or in a combination of the two. A software module may reside in RAM memory, flash memory, non-volatile memory, ROM memory, EPROM memory, EEPROM memory, registers, hard disk, a removable disk, a CD-ROM, or any other form of storage medium known in the art. An exemplary storage medium can be coupled to the processor such the processor can read information from, and write information to, the storage medium. In the alternative, the storage medium may be integral to the processor. The processor and the storage medium may reside in an ASIC.

The above description of the disclosed embodiments is provided to enable any person skilled in the art to make or use the disclosure. Various modifications to these embodiments will be readily apparent to those skilled in the art, and the generic principles defined herein may be applied to other embodiments without departing from the scope of the disclosure. Thus, the disclosure is not intended to be limited to the embodiments shown herein but is to be accorded the widest scope consistent with the principles and novel features disclosed herein.

What is claimed is:

1. A motion sensing device for use with interactive computer games, the device comprising:

a first camera configured to capture images along a first viewing axis;

a second camera configured to capture images along a second viewing axis different from the first viewing axis;

a motion processing module configured to receive images captured from the first camera, to receive images captured from the second camera, to determine a first direction of change based on the images captured along the first viewing axis, to determine a second direction of change based on the images captured along the second viewing axis, and to determine motion of the device based in part on comparing the first direction of change from the images captured from the first camera and the second direction of change from the images captured from the second camera;

a distance processing module configured to receive at least one image of a user's face from the first or second camera and determine a distance to the user based in part on the at least one image of the user's face; and a display configured to display images representing an augmented reality environment associated with an interactive computer game based in part on the motion of the device and the distance to the user, the images representing the augmented reality environment including a portion of the images captured from the first camera or a portion of the images captured from the second camera automatically modified according to the interactive computer game in response to the motion of the device and the distance to the user with a virtual image associated with the interactive computer game.

2. The device of claim 1, wherein the display is configured to display the images representing the augmented reality environment associated with the interactive computer game using only the portion of the images captured from the first camera as modified by the motion processing module according to the interactive computer game based in part on the motion of the device.

3. The device of claim 1, wherein the display is configured to display the images representing the augmented reality environment associated with the interactive computer game using only the portion of the images captured from the second camera as modified by the motion processing module according to the interactive computer game based in part on the motion of the device.

4. The device of claim 1, wherein the motion processing module is further configured to communicate data based on motion of the device to a base unit, and to receive information from the base unit based in part on the communicated motion of the device.

5. The device of claim 4, wherein the received information comprises the images representing the augmented reality environment associated with the interactive computer game.

6. The device of claim 1, wherein the first viewing axis and the second viewing axis are in substantially opposite directions.

7. The device of claim 1, wherein the first camera is positioned along a front of the device.

8. The device of claim 7, wherein the second camera is positioned along a rear of the device.

9. The device of claim 1, wherein the motion processing module is configured to determine an image translation of the images captured from the first camera and an image translation of the images captured from the second camera, and to determine the motion of the device based in part on the image translation of the images captured from the first camera and the image translation of the mages captured from the second camera; and wherein the images representing the augmented reality environment associated with the interactive computer game include the portion of the images captured from the first camera or the portion of the images captured from the second camera that have been automatically modified according to the interactive computer game in response to the motion of the device determined based in part on the image translation of the images captured from the first camera and the image translation of the images captured from the second camera.

10. The device of claim 1, wherein the motion processing module is further configured to determine the distance to the user s based in part on a user's eye distance determined from the at least one image of the user's face.

11. The device of claim 1, wherein the first camera, second camera, and motion processing module are contained within a portable device.

12. The device of claim 1, wherein the first camera and second camera are contained within a portable device remote from the motion processing module.

13. A motion sensing device for use with interactive computer games, the device comprising:

a first camera having a viewing axis directed away from a front of the device, the first camera configured to capture images along the viewing axis directed away from the front of the device;

a second camera having a viewing axis directed away from a rear of the device, the second camera configured to capture images along the viewing axis directed away from the rear of the device;

a motion processing module configured to receive images captured from the first camera, to receive images captured from the second camera, to determine a first direction of change based on the images captured from the first camera, to determine a second direction of change based on the images captured from the second camera, to determine a distance to a user based in part on at least one image in the images captured from the first or second camera of the user's face to determine a motion of the device based in part on comparing the first direction of change from the images from the first camera and the second direction of change from the images from the second camera, and to generate a display image representing an augmented reality associated with an interactive computer game based in part on the motion of the device and the distance to the user, the display image representing the augmented reality environment including a portion of the images captured from the first camera or a portion of the images captured from the second camera automatically modified by the motion processing module according to the interactive computer game in response to the motion of the device and the distance to the user with a virtual image associated with the interactive computer game; and a display coupled to the motion processing module and configured to display the display image representing the augmented reality environment associated with the interactive computer game.

14. A motion sensing system for use with interactive computer games, the system comprising:

a first camera positioned along a first viewing axis, the first camera configured to capture a first plurality of camera images along the first viewing axis;

a second camera positioned along a second viewing axis different from the first viewing axis, the second camera configured to capture a second plurality of camera images;

a motion processing module configured to receive the first plurality of camera images, to receive the second plurality of camera images, and to determine a motion parameter based in part on a comparison between a first change in direction indicated by at least two images in the first plurality of camera images and a second change in direction indicated by at least two images in the second plurality of camera images;

a distance processing module configured to receive at least one image of a user's face from a device associated with the first or second camera and determine a distance parameter based in part on the at least one image of the user's face, the distance parameter indicative of a distance to the user;

a base device configured to receive the motion parameter determined by the motion processing module and the distance parameter from the distance processing module, to process the motion parameter and the distance parameter to generate an augmented reality environment associated with an interactive computer game executed by the base device, and to generate a display signal representing the augmented reality environment associated with the interactive computer game based in part on the motion parameter and the distance parameter, the display signal representing the augmented reality environment including a portion of the first plurality of images or a portion of the second plurality of images automatically modified by the base device according to the interactive computer game in response to the motion parameter and the distance parameter with a virtual image associated with the interactive computer game; and a display configured to display the display signal generated by the base device representing the augmented reality environment associated with the interactive computer game.

15. The system of claim 14 wherein the base device comprises:

a storage device configured to store one or more virtual images; and wherein the base device is further configured to generate the display signal that represents the augmented reality environment associated with the interactive computer game by automatically modifying at least one of the one or more virtual images when retrieved from the storage device according to the interactive computer game based in part on the motion parameter.

16. The system of claim 14 wherein the motion processing module is further configured to communicate at least one of the second plurality of camera images to the base device, and wherein the base device generates the display signal representing the augmented reality environment associated with the interactive computer game based on only the at least one of the second plurality of camera images.

17. The system of claim 14 wherein the motion parameter comprises at least one parameter selected from the group comprising a device translation, and a device rotation.

18. The system of claim 14 wherein the distance processing module is further configured to estimate the distance to the user based in part on a user's eye distance determined from the image of the user's face.

19. A motion sensing method, the method comprising:

receiving a first plurality of images at a processor associated with a computer from a first camera associated with a device;

receiving a second plurality of images at the processor from a second camera associated with the device, wherein the first or second plurality of images includes an image of a user's face;

determining a first image translation with the processor based in part on the first plurality of images from the first camera;

determining a second image translation with the processor based in part on the second plurality of images from the second camera;

comparing the first image translation to the second image translation with the processor;

determining a distance to the user based in part on the image of the user's face;

determining motion of the device with the processor based in part on the comparison; and generating images that represent an augmented reality environment associated with an interactive computer game with the processor based in part on the motion of the device and the distance to the user, the images representing the augmented reality environment including a portion of the first plurality of images or a portion of the second plurality of images automatically modified by the processor according to the interactive computer game in response to the motion of the device and the distance to the user with a virtual image associated with the interactive computer game.

20. The method of claim 19, further comprising:

displaying the images representing the augmented reality environment associated with the interactive game on the device.

21. The method of claim 19, further comprising:

determining with the processor a distance from a user's eyes from the image of the user's face; and estimating with the processor a distance between the user and the device based in part on the distance from the user's eyes.

22. The method of claim 19, wherein receiving the second plurality of images at the processor from the second camera comprises receiving images at the processor from the second camera positioned substantially opposite the first camera.

23. A motion sensing method, the method comprising:

receiving at a base device a motion parameter determined from a comparison of between a first change of direction determined from images captured along a first viewing axis and a second change in direction determined from images captured along a second viewing axis substantially opposite the first viewing axis;

receiving at the base device a distance parameter determined from an image in the images captured along the first viewing axis or the images captured along the second viewing axis of a user's face, the distance parameter indicative of a distance to the user;

retrieving a first virtual image at the base device from a plurality of stored images using a storage device associated with the base device;

automatically modifying the first virtual image at the base device according to an interactive computer game based at least in part on the motion parameter and the distance parameter to create a modified virtual image that forms part of an augmented reality environment associated with the interactive computer game; and communicating the modified virtual image to the portable device.

24. The method of claim 23, further comprising:

receiving at least one image captured along the first viewing axis at the base device; and modifying the first virtual image at the base device based in part on the at least one image captured along the first viewing axis.

25. The method of claim 24, further comprising:
receiving at least one image captured along the second viewing axis at the base device; and
modifying the first virtual image at the base device based in part on the at least one image captured along the second viewing axis.

26. A computer readable storage medium having stored thereon instructions configured to cause determination of a device motion, the instructions comprising:
program code for receiving a first plurality of images from a first camera associated with a device;
program code for receiving a second plurality of images from a second camera associated with a device, wherein the first or second plurality of images includes an image of a user's face;
program code for determining a first image translation based in part on the first plurality of images from the first camera;
program code for determining a second image translation based in part on the second plurality of images from the second camera;
program code for comparing the first image translation to the second image translation;
program code for determining a distance to the user based in part on the image of the user's face; program code for determining motion of the device based in part on the comparison;
program code for generating images that represent an augmented reality environment associated with an interactive computer game based in part on the motion of the device and the distance to the user, the images representing the augmented reality environment including a portion of the first plurality of images or a portion of the second plurality of images automatically modified according to the interactive computer game in response to the motion of the device and the distance between the user with a virtual image associated with the interactive computer game.

27. A computer readable storage medium having stored thereon instructions configured to cause communication of a modified image to a portable device, the instructions comprising:
program code for receiving a motion parameter determined from images captured along a first viewing axis and images captured along a second viewing axis substantially opposite the first viewing axis;
program code for receiving a distance parameter determined from an image in the images captured along the first viewing axis or the images captured along the second viewing axis of a user's face, the distance parameter indicative of a distance to the user;
program code for retrieving a first virtual image from a plurality of stored images;
program code for automatically modifying the first virtual image according to an interactive computer game based at least in part on the motion parameter and the distance parameter to create a modified virtual image that forms part of an augmented reality environment associated with the interactive computer game; and
program code for communicating the modified virtual image to a portable device.

28. A motion sensing system for use with interactive computer games, the system comprising:
a first camera positioned on a first side of a game controller along a first viewing axis, the first camera configured to capture a first plurality of camera images along the first viewing axis;
a second camera positioned on the game controller along a second viewing axis substantially opposite the first viewing axis, the second camera configured to capture a second plurality of camera images along the second viewing axis;
a motion processing module in communication with the first and second cameras and configured to receive the first plurality of camera images, to receive the second plurality of camera images, and to determine a motion parameter based in part on a comparison between a first change in direction indicated by at least two images from the first plurality of camera images and a second change in direction indicated by at least two images from the second plurality of camera images;
a distance processing module configured to receive at least one image of a user's face from the first or second camera and determine a distance parameter based in part on at least one image of a user's face from the first or second camera, the distance parameter indicative of a distance to the user;
a processor configured to retrieve a virtual image from a storage device and to automatically modify the virtual image based in part on the motion parameter and the distance parameter, the virtual image forming part of an augmented reality environment associated with an interactive computer game executed by the processor, the augmented reality environment including a portion of the first plurality of images or a portion of the second plurality of images automatically modified according to the interactive computer game in response to the motion of the device and the distance to the user using the virtual image; and
a display positioned on the game controller and configured to display images representing the augmented reality environment generated by the processor.

29. The system of claim 28, wherein the processor and storage device are included in a game console that is external to the game controller.

30. The system of claim 28, wherein the processor and storage device are included in the game controller.

31. The system of claim 28, wherein the storage device comprises a storage medium having game images stored therein.

32. The system of claim 28, wherein the game controller comprises at least one input device configured to receive user input.

* * * * *